United States Patent
Arai et al.

[11] Patent Number: 6,166,857
[45] Date of Patent: Dec. 26, 2000

[54] OPTICAL GUIDE FIXTURE

[76] Inventors: Mikki Arai, 16 April La., Lexington, Mass. 02421; Tatsuo Hirose, 8 Whittier Pl. #12H, Boston, Mass. 02114

[21] Appl. No.: 09/497,918

[22] Filed: Feb. 4, 2000

Related U.S. Application Data

[63] Continuation-in-part of application No. 09/425,256, Oct. 22, 1999, abandoned.

[51] Int. Cl.[7] .............................. G02B 27/14; G02B 27/00
[52] U.S. Cl. ......................... 359/630; 359/894; 359/436; 359/442; 359/645; 359/806; 359/798; 348/63; 356/371
[58] Field of Search ..................................... 359/630, 645, 359/436, 440, 441, 442, 798, 799, 802, 804, 806, 894; 348/63, 376; 356/371, 376

[56] References Cited

U.S. PATENT DOCUMENTS

| | | |
|---|---|---|
| 1,487,173 | 3/1924 | Manion . |
| 1,518,419 | 12/1924 | Styll . |
| 2,420,716 | 5/1947 | Morton et al. . |
| 2,451,014 | 10/1948 | Zworykin et al. . |
| 2,850,404 | 9/1958 | Dunlap . |
| 3,119,185 | 1/1964 | Gray . |
| 3,766,473 | 10/1973 | Fleetman .................................. 359/436 |
| 3,993,865 | 11/1976 | Browne et al. ............................ 178/7.6 |
| 4,136,361 | 1/1979 | Doan .......................................... 358/94 |
| 4,206,978 | 6/1980 | Leopoldi .................................. 350/252 |
| 4,261,204 | 4/1981 | Donaldson ............................... 359/436 |
| 4,330,169 | 5/1982 | Kantor ......................................... 350/9 |
| 4,621,283 | 11/1986 | Feinbloom ................................. 358/93 |
| 4,639,097 | 1/1987 | Teske et al. .............................. 359/798 |
| 4,797,736 | 1/1989 | Kloots et al. .............................. 358/93 |
| 4,917,462 | 4/1990 | Lewis et al. ............................. 359/894 |
| 5,028,941 | 7/1991 | Sohn ......................................... 354/75 |
| 5,046,163 | 9/1991 | Priest et al. ............................... 348/63 |
| 5,244,369 | 9/1993 | Miller et al. ............................. 359/894 |
| 5,656,280 | 8/1997 | Herb et al. ................................ 424/401 |
| 5,724,139 | 3/1998 | Guerra ...................................... 356/371 |
| 5,745,177 | 4/1998 | Lamoure ................................... 348/373 |

*Primary Examiner*—Loha Ben
*Attorney, Agent, or Firm*—Foley, Hoag & Eliot LLP; W. Hugo Liepmann

[57] ABSTRACT

The present invention provides an optical guide fixture for coupling visual information on a surface to a viewer. The optical guide fixture of the invention can be coupled to an optical receiver, such as a digital camera, operably connected to a head-mounted display unit to provide a device according to the invention for viewing a surface. Such a device, in one application, provides magnified images of visual information on a surface, such as a page of a book, to a patient with a visual impairment.

26 Claims, 8 Drawing Sheets

OPTICAL GUIDE FIXTURE

RELATED APPLICATION

This application is a continuation in part of the commonly assigned and copending application entitled OPTICAL GUIDE FIXTURE, Ser. No. 09/425,256, filed Oct. 22, 1999, now abandoned.

BACKGROUND OF THE INVENTION

The present invention relates to an optical guide fixture for coupling visual information on a surface to an optical viewer. More particularly, the invention provides an apparatus having such an optical guide fixture for convenient viewing of visual information present on a surface.

A number of devices are known for assisting an individual having a visual impairment to view visual information, such as text and graphics, on a surface. Some such devices employ a scanner, such as a mouse-like device, having an optical receiver therein to obtain data corresponding to the visual information on the surface, and to transmit the data to a closed circuit television (CCTV) to be viewed on a television monitor. For example. U.S. Pat. No. 5,046,163 describes such a device. Such conventional devices are typically bulky, and hence are not easily portable. Further, an individual employing such a device can not easily determine which portion of the surface is being shown on the monitor because the scanner partially obstructs the surface. In addition, the scanner of such a device is typically bulky and hence is not suitable for scanning areas of the surface that are not easily accessible, such as the border areas between two adjacent pages of a book.

Another conventional system includes a head-mounted display unit coupled to a camera for viewing visual information on a surface. Such a system typically does not provide a mechanism for conveniently aiming the camera at a selected portion of the surface. This can lead to confusion, especially for a visually-impaired patient, regarding which portion of the surface is being viewed. In addition, a person other than the viewer can not easily determine which portion of the surface is being viewed. This is particularly disadvantageous in an educational setting, for example, where an instructor is helping a patient read a book. In addition, such systems are typically heavy, and are cumbersome to wear.

Another conventional system, described in U.S. Pat. No. 4,330,169, includes a scanning head coupled to a bundle of optical fibers. A visually impaired individual views a portion of a surface bearing visual information by looking through a telescope that is coupled to the optical fibers. The scanning head of this device has a relatively narrow field of view. Further, the field of view of the fibers and that of the scanning head are different. Further, the scanning head of this patent is rotationally symmetric, thereby rendering rotational alignment of the scanning head relative to the surface and/or guided translation of the scanning head along a selected direction over the surface difficult. Another defect of the system of the '169 patent is that the telescope does not follow the movements of the patient's head. Accordingly, the patient must keep the head stationary relative to the telescope in order not to lose the view of the surface. This can lead to fatigue and renders viewing of the surface over a long period inconvenient.

Thus, it is an object of the invention to provide an optical guide fixture for conveniently scanning a surface bearing visual information, to couple the visual information to an optical receiver.

It is another object of the invention to provide an optical guide fixture that can be conveniently rotationally aligned relative to a surface.

It is another object of the invention to provide a portable device for aiding a visually impaired patient to view visual information on a surface.

It is yet another object of the invention to provide a device for aiding a visually impaired patient to view information on a surface, which is light weight and easy to wear.

SUMMARY OF THE INVENTION

The present invention provides an optical guide fixture that is adapted for coupling visual information on a surface to an optical receiver. The optical guide fixture includes a body that has opposed ends, where each end forms an optical window. The term "window" as used herein refers to both an optical opening and to an optical aperture having an optically transparent material. The two windows of the optical guide fixture are in optical communication with each other, and are spaced apart by a selected distance along an optical axis. An input window of the optical fixture is adapted for manually-guided translation along the surface on which the visual information resides, and an output window of the fixture is adapted for coupling with an optical receiver so that the receiver can receive optical information present at the first window.

The body of the optical fixture is preferably tubular, and is sufficiently optically transparent to allow external viewing of a portion of the surface that is within the field of view of the first window through the body of the optical fixture. Some optically transparent materials that are suitable for forming the body of the optical fixture include, but are not limited to, optically clear plastic and glass. The optical fixture has manually-engageable guide elements that are mounted with the body and are adapted for disposing the body of the optical fixture on the surface with one of the windows, i.e., the window that is adapted for manually-guided translation along the surface, in selected placement and selected rotational alignment on the surface. The manually-engageable guide elements can form a single, integral unit with the tubular body, or alternatively can be formed as a separate structure to be attached to the tubular body.

According to one aspect of the invention, at least a portion of the body of the optical guide fixture has a cross-section, transverse to the optical axis of the fixture, that progressively increases in size along the optical axis so that the window that is adapted for manual translation on the surface is larger than the other window. In one preferred embodiment of the optical guide fixture, this cross-section is circular and the portion of the fixture having this circular cross-section has a conical shape.

In another aspect, the body of the optical guide fixture is hollow to provide an air-filled optical path along the optical axis for optical communication between the input and the output windows of the fixture. Alternatively, the tubular body of the fixture can be solid, and can be formed of an optically transparent material, such as clear plastic.

According to another aspect, the manually engageable guide elements of the optical fixture include a handle region on the outer surface of the tubular body of the fixture. The handle region can include a manually-perceptible surface irregularity, such as a flat portion, for positioning the fixture with a selected rotational alignment on a surface bearing visual information, and for manually-guided translation of the optical fixture in a selected direction on the surface.

In accordance with another aspect of the invention, the optical guide fixture includes an optical receiver, such as a digital camera, that is coupled to the output window of the fixture, i.e., the window opposite to the window that is adapted for positioning on a surface bearing visual information. The optical receiver has a selected focal length and is preferably coupled to the optical fixture such that it is spaced from the surface by a distance substantially equal to its focal length.

The optical receiver provides an image, along the optical axis of the fixture, of a portion of the surface that is within the field of view of the input window of the fixture. The optical receiver is preferably selected to have a field of view corresponding to the field of view of the input window of the fixture.

Another optional aspect of the invention couples an optical receiver to the output window of the fixture, and further optionally disposes a lens within the tubular body of the optical fixture between the input and the output windows. The lens is positioned within the body such that the optical receiver and the input window, i.e., the window contacting the surface, lie substantially in conjugate planes of the lens. Thus, the lens focuses light emanating from at least a portion of the surface within the field of view of the first window onto the optical receiver, to provide an image of that portion of the surface which is within the field of view of the input optical window.

In another aspect, the invention provides a system for viewing visual information present on a surface. The system includes an optical guide fixture coupled to an optical receiver, such as a digital camera, as described above, and further includes a head-mounted display unit that is operably coupled to the optical receiver. The optical receiver receives visual information within the field of view of a window of the fixture contacting the surface, and transmits data corresponding to this visual information to the head-mounted display unit. One preferred head-mounted display unit includes liquid crystal display (LCD) elements that provide an image of the visual information to a viewer wearing the head-mounted display unit.

According to a further optional aspect of the invention, the head-mounted display unit includes a holder for removably and replaceably attaching the optical guide fixture thereto. This allows a viewer to view a surface, such as a page of a book, by bringing the surface into contact with a window of the optical fixture, and turning the head to scan different portions of the surface.

The system of the invention for viewing visual information can include a control unit that optionally allows altering the contrast polarity and/or the intensity contrast of the image that the head-mounted display unit presents to the viewer.

In another aspect of the invention, the head-mounted display unit includes only one viewing screen that can be placed in front of a selected eye of the viewer, and can be easily moved from one location to another within the display unit, for example, the screen can be moved from a first location corresponding to one eye of the viewer to a second location corresponding to the other eye of the viewer.

Another aspect of the invention optionally mounts at least one corrective lens to the head-mounted display unit to provide additional visual aid to the viewer.

According to another aspect of the invention, a filter, mounted to the head-mounted display unit, filters a selected range of electromagnetic wavelengths of the image presented to the viewer.

In another aspect, one or more prisms, mounted to the head-mounted display unit provide selective deflections of the light rays emanating from an image presented by the head-mounted display unit. Such selective deflections of the light rays can advantageously allow a patient having macular degeneration to view the image without a need to move her eye to focus the image on the functional portions of the retina.

These and other features of the invention are more fully set forth below with reference to the illustrated embodiments, and the accompanying drawings.

ILLUSTRATED EMBODIMENTS

Figure 1:
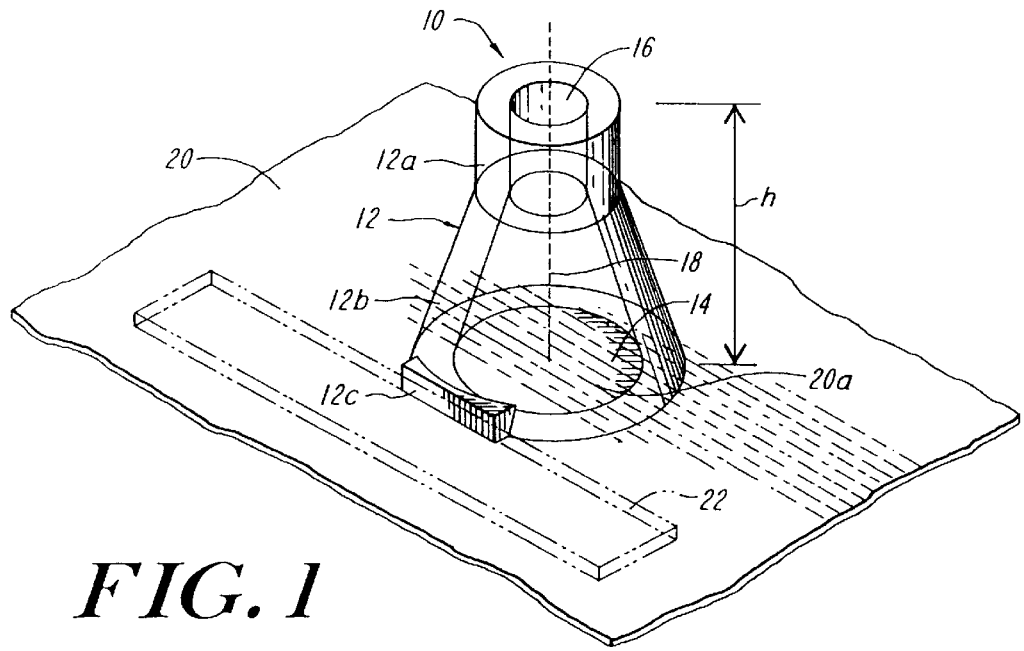
FIG. 1 is a perspective view of an optical guide fixture according to the teachings of the present invention, which is rotationally aligned relative to a surface bearing visual information.

FIG. 1 illustrates an exemplary optical guide fixture 10 according to teachings of the present invention that includes a optical body 12 having two optical windows, termed an input window 14 and an output window 16, at its opposed ends. In one preferred embodiment of the guide fixture, the windows 14 and 16 are open apertures, and in another preferred embodiment the windows 14 and 16 are optical apertures formed with an optically transparent material, such as glass, clear plastic or the like. The windows 14 and 16 are in optical communication with each other along an optical axis 18. In the illustrated fixture 10 of FIG. 1, the optical body 12 is tubular and the optical axis 18 extends through the air-filled hollow interior of the tubular body 12. Further, the illustrated guide fixture 10 has a height (h) that provides a selected optical distance, along the optical axis 18, between the windows 14 and 16.

The exemplary tubular body 12 includes an upper cylindrical portion 12a extending, from the output window 16, to a lower portion 12b that has a cross-section, transverse to the optical axis 18, that progressively increases in size along the optical axis 18 toward the input window 14. The tubular body 12 further includes a circumferential flat portion 12c, herein referred to as a "flat", on its outer surface in proximity to the input window 14. The flat 12c provides a manually-perceptible irregularity that facilitates manual disposition of the optical guide fixture 10 on a surface 20 bearing visual information, such as a text of characters, with the window 14 in a selected rotational orientation relative to the surface 20. The optical guide fixture 10 can be disposed on the surface 20 with the flat 12c abutting against a guide 22, such as a ruler, in a particular rotational orientation. The window 14, when disposed on the surface 20, surrounds a portion 20a of the surface 20. The optical guide fixture 10 couples the visual information within the portion 20a along the optical axis 18 to the output window 16. Thus, a viewer can view the visual information through the second window 16.

Further, the optical body 12 is preferably formed of an optically transparent material, such as clear plastic or the like, that allows external viewing of the portion 20a through the body 12. This advantageously allows selected external positioning of the window 14 on the surface 20, without a need to view the surface 20 through the window 16 for such selected placement.

Figure 2:
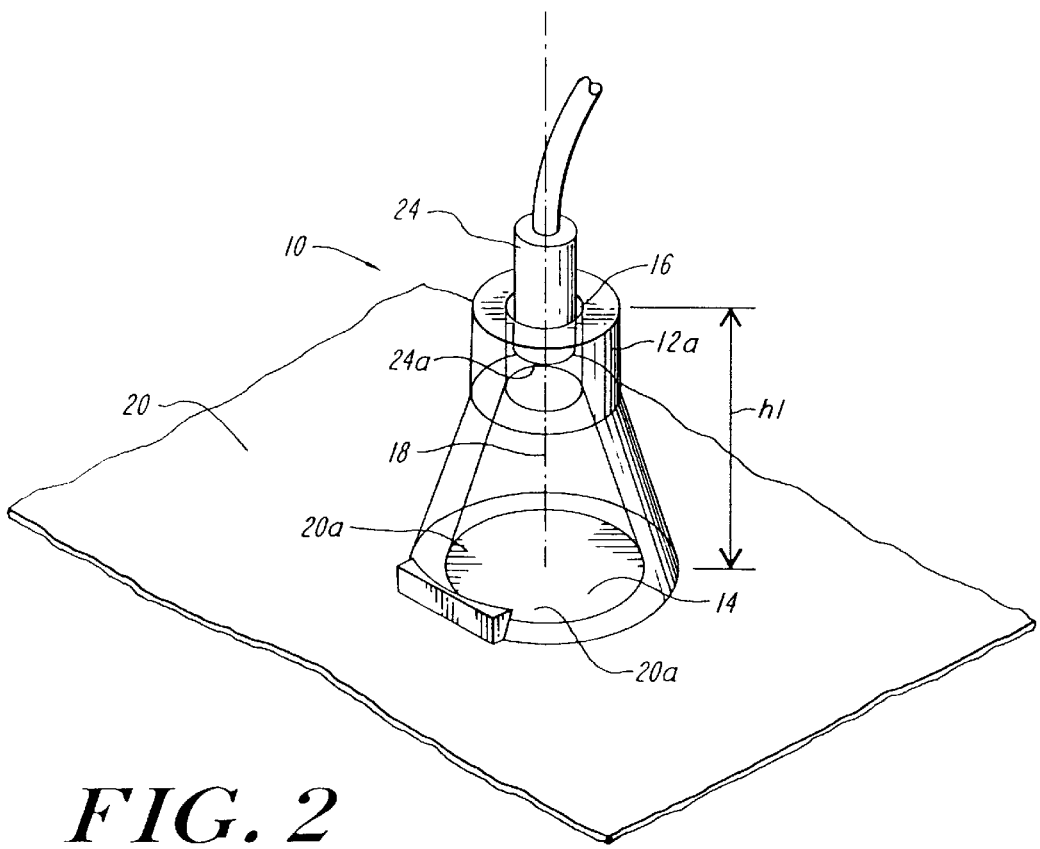
FIG. 2 is another perspective view of the optical guide fixture of FIG. 1, to which an optical receiver is coupled.
Figure 3A:
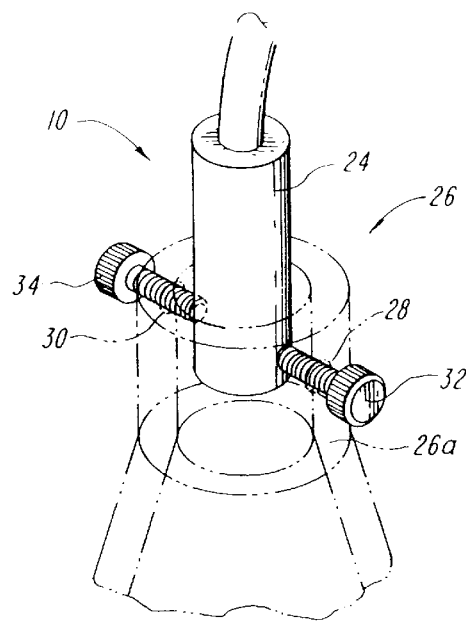
FIG. 3A is a perspective view of an optical guide fixture according to the teachings of the invention having threaded openings therein for two set screws that hold an optical receiver within the body of the fixture.

FIG. 2 illustrates that the second window 16 is adapted for coupling with an optical receiver 24, such as a digital camera. The optical receiver 24 can be partially inserted into the upper cylindrical portion 12a, and kept in place by frictional engagement between its outer surface and the inner surface of the cylindrical portion 12a. Alternatively, the optical receiver 24 can be glued, or otherwise fastened or secured by conventional manner, to the cylindrical portion 12a. Those skilled in the art will understand that there are other alternative mechanisms for attaching the optical receiver 24 to an optical guide fixture according to the present invention. For example, FIG. 3A illustrates an optical fixture 26 according to an alternative embodiment of the invention having two threaded openings 28 and 30 in a cylindrical portion 26a thereof for receiving two set screws 32 and 34 for holding the optical receiver 24 within the optical guide fixture 26.

Referring again to FIG. 2, a viewing surface 24a of the optical receiver 24, engaged with the optical guide fixture 10, such as the surface in which charge coupled device (CCD) elements of a digital camera lie, faces the input window 14, and is preferably substantially perpendicular to the optical axis 18. Thus, the surface 24a functionally provides the output window of the optical fixture 10. Further, a preferred embodiment of the invention places the optical receiver 24 at a selected distance (h1) from the window 14 such that the field of view (FOV) of the optical receiver 24 encompasses a selected portion 20a of the surface 20, which is encompassed by the window 14. That is, the FOV of the optical receiver 24 preferably is selected to correspond to the field of view of the window 14.

Figure 3B:
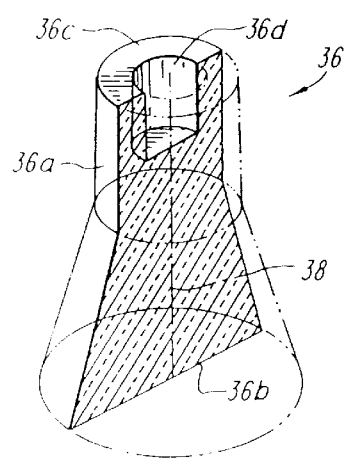
FIG. 3B is a perspective view of a solid optical guide fixture according to the invention formed of an optically transparent material.

An optical guide fixture according to the present invention is not limited to one having a hollow tubular body. In particular, FIG. 3B illustrates an optical guide fixture 36 according to an alternative embodiment of the invention and having a solid body 36a, formed of an optically transparent material, such as glass. The transparent body 36a allows propagation of light emanating from visual information within the FOV of an input window 36b of the fixture 36 along an optical axis 38 to an output window 36c of the fixture 36. The optical fixture 36 can further include a housing, or similar receiving structure, 36d therein for accommodating and mounting an optical receiver (not shown) for receiving visual information within the FOV of the window 36b.

Figure 4:
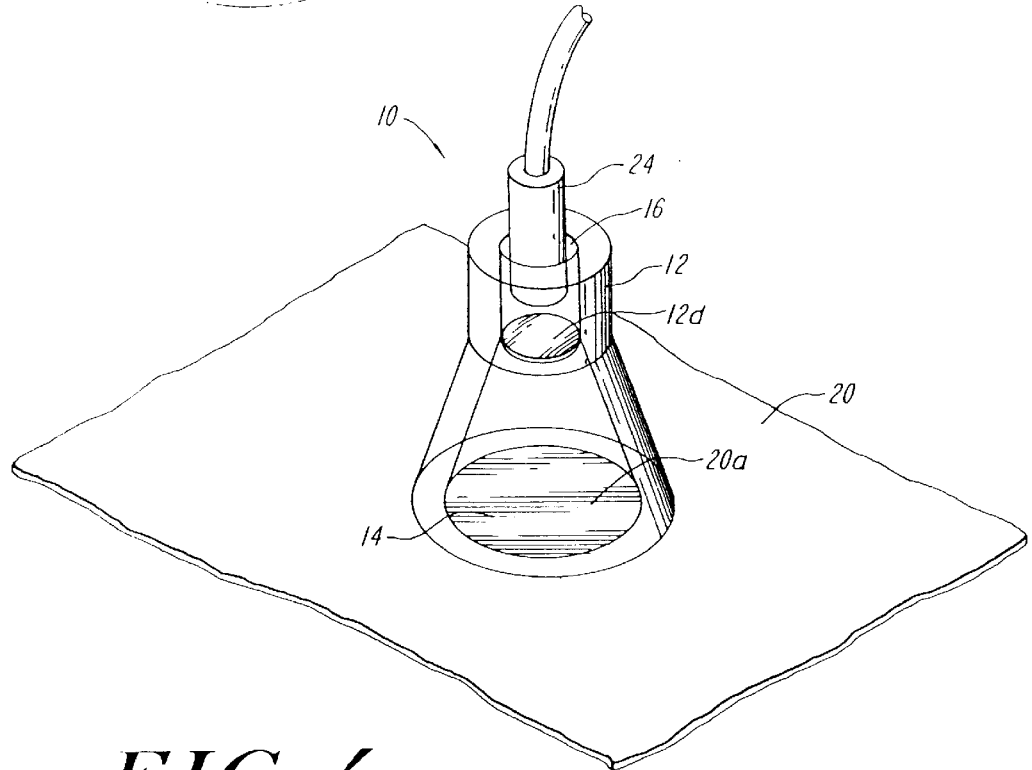
FIG. 4 is a perspective view of the optical guide fixture of FIG. 2 in which a lens is disposed.

FIG. 4 illustrates that one optional aspect of the invention disposes a lens 12d within the optical body 12 of the optical guide fixture 10. The lens is engaged along the optical axis 18 and is coupled to the optical receiver 24, between the windows 14 and 16. The lens 12d is positioned within the tubular body 12 such that the window 14 and the optical receiver 24 lie substantially in its conjugate planes. The lens 12d focuses light emanating from the portion 20a of the surface 20, which is within the FOV of the window 14, onto the input facet of the optical receiver 24.

Figure 5:
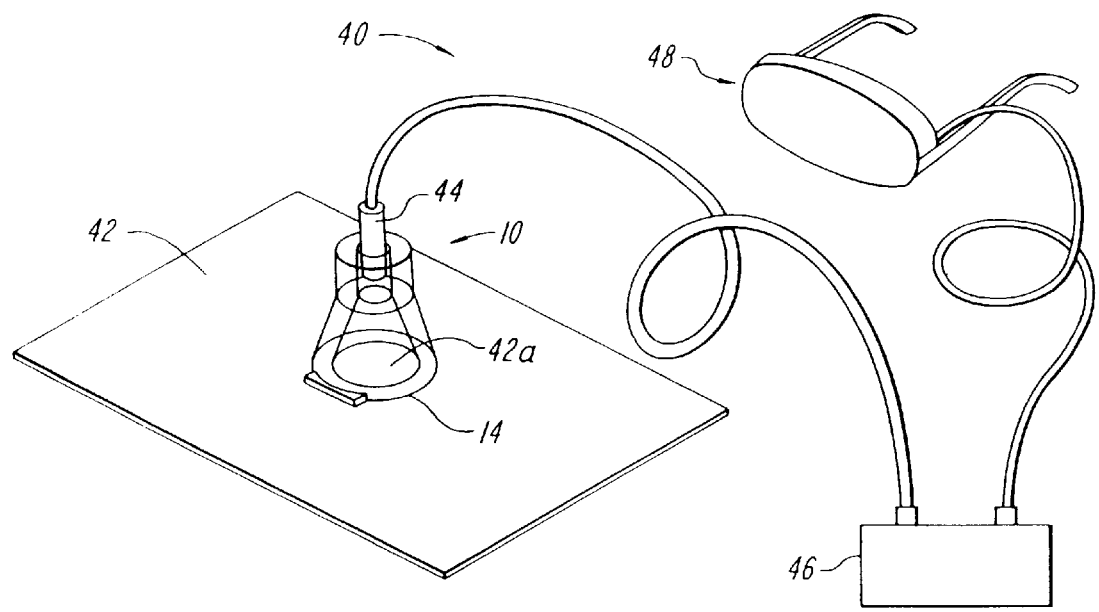
FIG. 5 is a perspective view of a system according to the invention for viewing visual information present on a surface.

With reference to FIG. 5, another aspect of the present invention provides a viewing system 40 for viewing visual information present on a surface 42. The illustrated viewing system 40 includes the optical guide fixture 10, described above, coupled to an optical receiver 44, such as a digital camera. One preferred embodiment of the invention employs as the optical receiver 44 a digital camera produced by Elmo Compay of Nagoya, Japan, under the designation QN42H and having a tradename of Super micro color CCD. Those skilled in the art will understand that other digital cameras can also employed as the optical receiver 44. The optical receiver 44 receives visual information in a portion 42a of the surface 42, which is within the field of view of the input window 14 of the optical guide fixture 10, and transmits data corresponding to such visual information to a control unit 46, which in turn transmits the data to a head-mounted display unit 48. The display unit 48 can include, for example, liquid crystal display (LCD) elements for displaying the visual data to a viewer on two screens, each for one eye of the viewer. One preferred embodiment of the system 40 employs as the head-mounted display unit 48 a glasses-type head-mounted display unit and its accompanying control unit produced by Canon Inc. of Tokyo, Japan under the trade designation GT270, or by Sony, Inc. of Tokyo, Japan under the trade designation PLM-A55.,. The control unit 46 allows selecting the brightness and/or the magnification of an image that the head-mounted display unit presents to a viewer.

Figure 6:
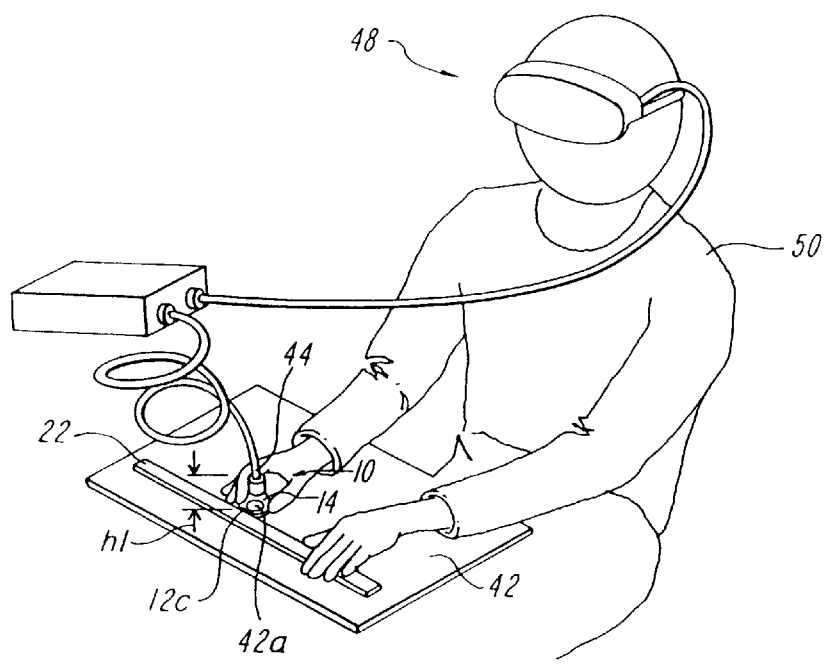
FIG. 6 illustrates a user, such as a patient, employing the system of FIG. 5 for viewing visual information on a surface.

In use, a person, such as a patient with a visual impairment, can employ the system 40 to view visual information, such as text on a surface 42. For example, FIG. 6 illustrates a patient 50 employing the device 40 for reading a page of a book. The patient 50 initially places the input window 14 of the optical guide fixture 10, coupled to the optical receiver 44, on a selected portion of the page in a selected rotational orientation by abutting the flat 12c of the optical fixture 10 against the guide element 22 positioned on the surface 42, or by visually aligning the flat 12c with an edge of the page or with any other alignment indicia. The optical receiver 44 presents visual data corresponding to the visual information within the instantaneous field of view of the window 14 to the head-mounted display unit 48, worn by the patient 50. The head-mounted display unit 48 provides an image of the visual data to the patient. The patient can conveniently translate the optical guide fixture 10 in a selected linear direction and in a selected rotational orientation by sliding the flat 12c against the guide element 22, to view the text on various portions of the surface 42.

With continuing reference to FIG. 6, a distance (h1) between the optical receiver 44 and the input window 14 is selected to be a fixed value such that the portion 42a of the surface 42, which is within the field of view of the window 14, is in the focal plane of the optical receiver 44. This provides a fixed-focus system that obtains a sharp image of a portion of the surface 42 so long as the portion contacts the window 14. Thus, the system 40 does not require any adjustment of the focal length of the optical receiver 44 as the optical fixture 10 is scanned over the surface 42 with the window 14 in contact with the surface 42. Another advantage of the system 40 is that the optically transparent body 12 of the optical guide fixture 10 allows the patient, or another person, to place the optical fixture 10 on a desired location of the surface 42 by externally viewing the surface 42 through the transparent body 12.

Another advantage of the system 40 is that the head-mounted display unit 48, when worn by a patient, follows the head movements of the patient. Thus, the image that the display unit 48 provides to the patient remains in the patient's field of view, even as the patient's head moves. In addition, the system 40 can provide a desired degree of magnification and brightness of an image of visual information on a surface. Further, the system 40 is advantageously portable, light-weight and easy to wear, thus rendering it particularly suited for a visually-impaired patient.

Accordingly, one application of the system 40 is to provide magnified images of visual information on a surface, such as printed characters on a page of a book, to a patient who suffers from a visual impairment. Such visual impairments include, but are not limited to, macular degeneration, cataracts, corneal scarring, intra-ocular light scattering, and the like. In particular, the system 40 allows such a visually-impaired patient to read small printed characters with a greater ease.

Further, the control unit 46 optionally allows electronically altering the contrast polarity of an image that the head-mounted display unit presents to the viewer. For examples, the control unit can control the head-mounted display to provide an image having a dark background on which bright characters are displayed. Alternatively, the background can be selected to have any desired color, such as blue or orange. Further, the control unit 46 can be optionally configured to electronically enhance the intensity contrast of the image.

Figure 7:
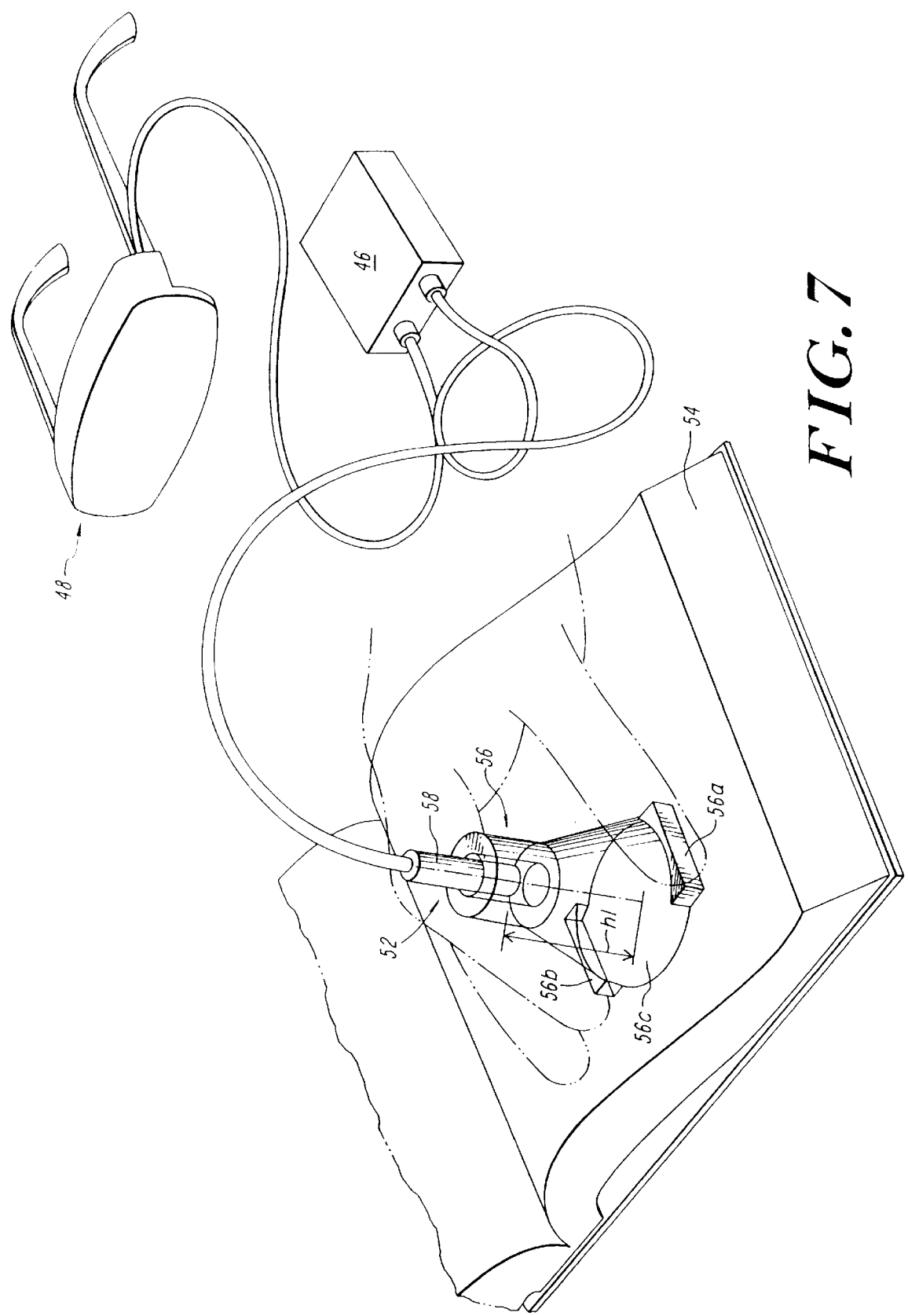
FIG. 7 illustrates a user employing a viewing system according to the invention for viewing visual information present on an uneven surface.

FIG. 7 illustrates that a viewer can employ a viewing system 52 according to the invention to view visual information present on an uneven surface 54. The exemplary device 52 includes an optical guide fixture 56 in accordance with a preferred embodiment of the invention, and further includes the display unit 48 and the control unit 46, described above in connection with the previous embodiment. The optical guide fixture 56 has two circumferentially opposed flats 56a and 56b. The viewer can hold the optical fixture 56 by grabbing the optical flats 56a and 56b, to translate the optical guide fixture 56 over the surface 54 while maintaining a window 56c of the optical guide fixture 56 in contact with the surface 54. A digital camera 58 is coupled to the optical fixture 56 at a fixed selected distance hi from the window 56c. Hence, as the viewer scans the optical guide fixture 56 over the surface 54, any portion of the surface 54 that is within the instantaneous field of view of the window 56c has a fixed distance h1 from the camera 58, and therefore remains in focus. The digital camera 58 transmits data corresponding to the visual information on the surface 54 to the head-mounted display unit 48 to be viewed by the viewer.

Figure 8:
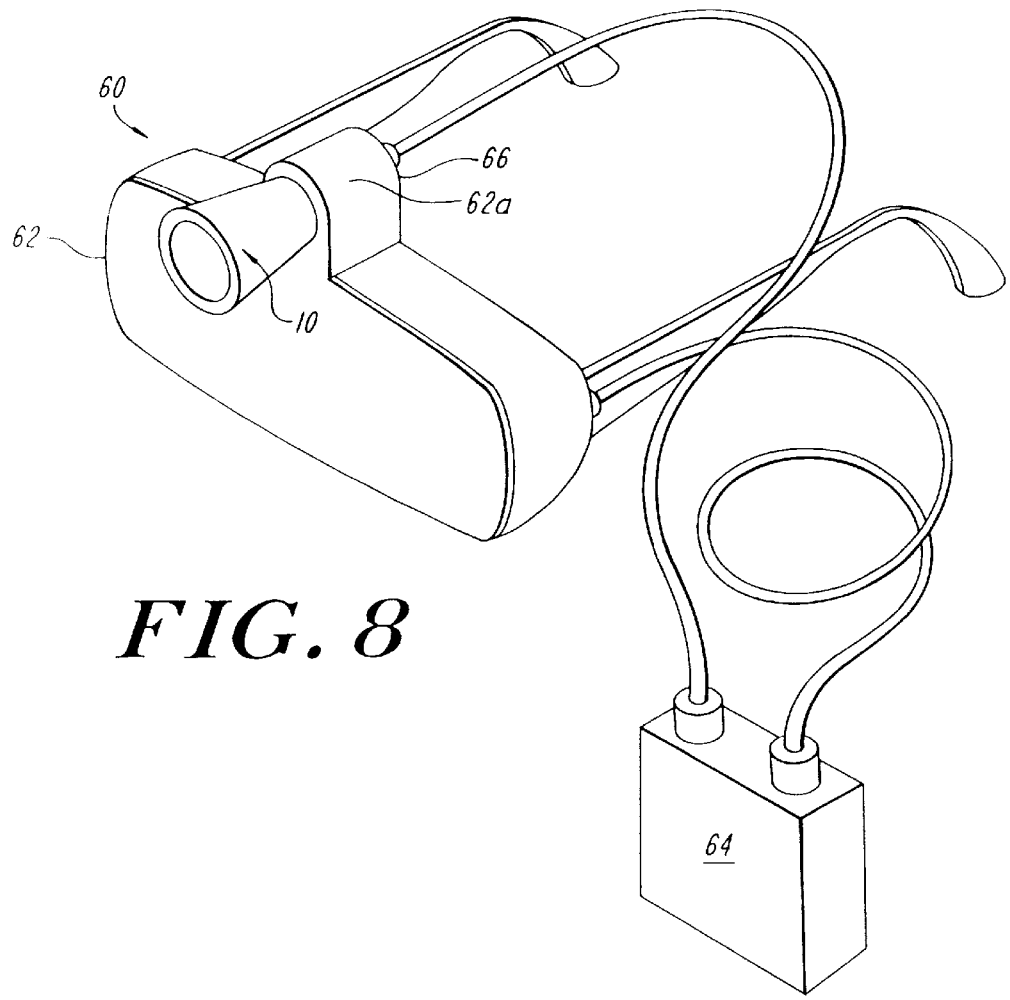
FIG. 8 is a perspective view of a viewing system according to the present invention having a head-mounted display unit that includes a holder for attaching an optical guide fixture of the invention to the display unit.

FIG. 8 illustrates a viewing system 60 according to another preferred embodiment of the invention that includes a head-mounted display unit 62, a control unit 64, and an optical guide fixture in accordance with the teachings of the invention, such as the optical guide fixture 10 described above, coupled to an optical receiver 66. The head-mounted display unit 62 further includes a holder 62a, attached thereto or formed integrally therewith, for removably and replaceably attaching the optical guide fixture 10, with the optical receiver 66 couple thereto, to the display unit 62.

Figure 9:
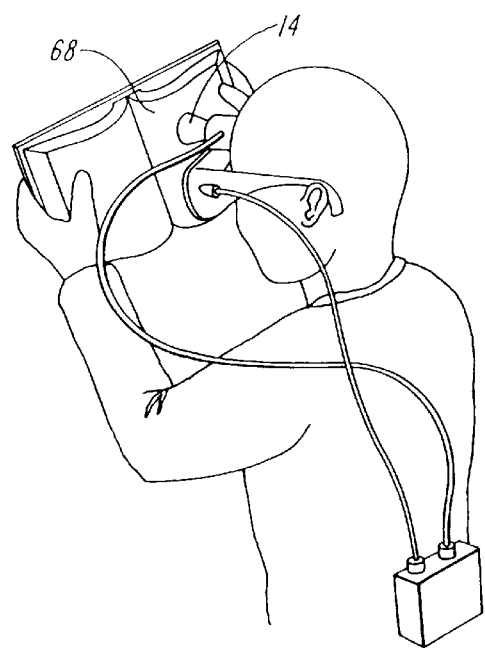
FIG. 9 illustrates a user employing the system of FIG. 8 for viewing visual information present on a surface.

In use, as shown in FIG. 9, a viewer can wear the head-mounted display unit 62 to view visual information present on a surface 68, for example, by bringing the surface 68 into contact with the window 14 of the optical guide fixture 10. Because the optical receiver 66 is positioned at a selected distance, which is substantially equal to its focal length, relative to the window 14, a portion of the surface 68 that is in contact with the window 14 will lie substantially in the focal plane of the optical receiver 66. Hence, the viewer can conveniently scan the surface 68, by either moving the surface 68 relative to optical guide fixture 10 or moving the head relative to the surface 68, while maintaining the window 14 in contact with the surface 68. Maintaining contact between the window 14 and a portion of the surface being examined ensures that the portion of the surface remains in focus. This advantageously eliminates the need for adjusting the focal length of the optical receiver 66, e.g. a digital camera, while the visual information on the surface 68 is being examined. That is, the viewing system 60 of the invention provides a fixed focus system, which is easier and cheaper to produce than many conventional systems that require auto-focusing.

Figure 10:
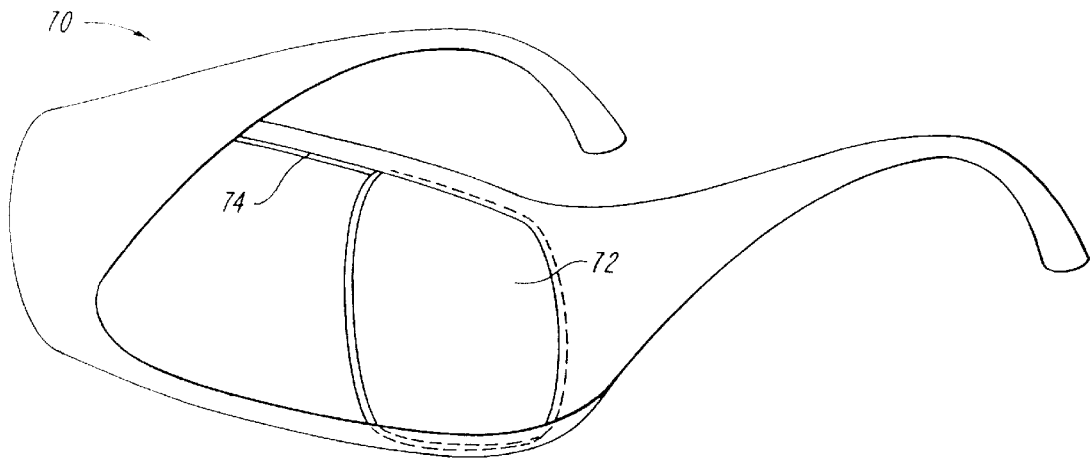
FIG. 10 is a perspective view of a head-mounted display unit for use in a viewing system according to the invention, which includes a viewing screen that can be positioned in front of a selected eye of a viewer, and can be moved from one location within the display unit to another.

FIG. 10 illustrates a head-mounted display unit 70 according to another embodiment of the invention that includes only one screen 72 that can be disposed in front of one eye of a patient for displaying visual information to the patient. In particular, the head-mounted display unit 70 includes a channel 74 in which the screen 72 is engaged. A patient can conveniently move the screen 72 along the channel 74, to place it in front of one eye or the other. A patient typically prefers having the screen 72 in front of the eye having a better visual ability. One advantage of the head-mounted display unit 70 is that while one eye can view the screen 72, the other eye can provide an unobstructed view of the environment to the patient, for example the location whose image the display presents. Those skilled in the art will understand that a head-mounted display unit that allows a patient to select the position of the screen 72 is not limited to the one described above. For example, another alternative head-mounted display unit allows the patient to remove the screen located at one position, e.g., in front of one eye, from the head-mounted display unit, and place it in another position, e.g., in front of the other eye.

Figure 11:
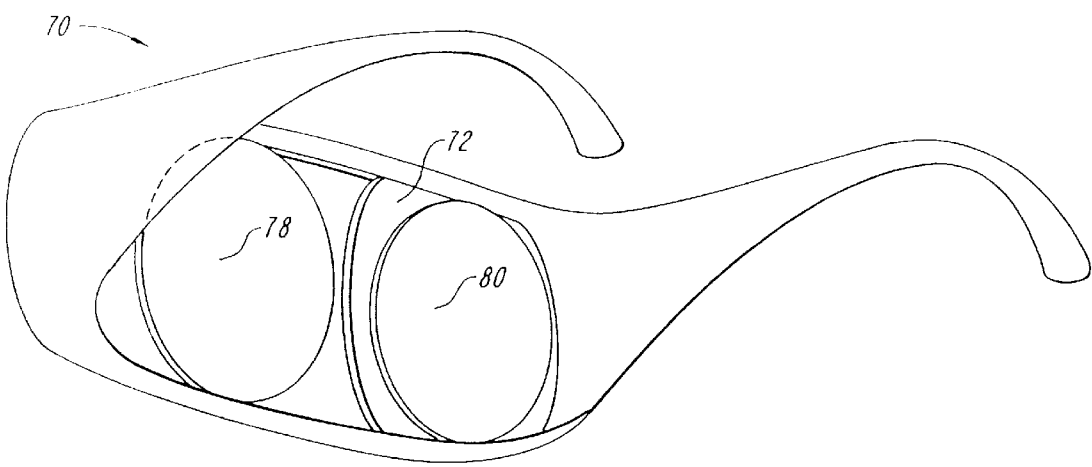
FIG. 11 is a perspective view of another head-mounted display unit according to the invention that includes the viewing screen of the head-mounted display unit of FIG. 10, and further includes two corrective lenses, each mounted to the display unit to be in front of one eye of the viewer, to provide additional visual aid to the viewer.

FIG. 11 illustrates another head-mounted display unit 76 that includes the screen 72 and further includes corrective lenses 78 and 80, positioned such that each corrective lens is placed in front of one eye of the patient when the patient wears the head-mounted display unit 76. This advantageously allows a patient to wear corrective lenses and simultaneously employ the screen 72.

Figure 12:
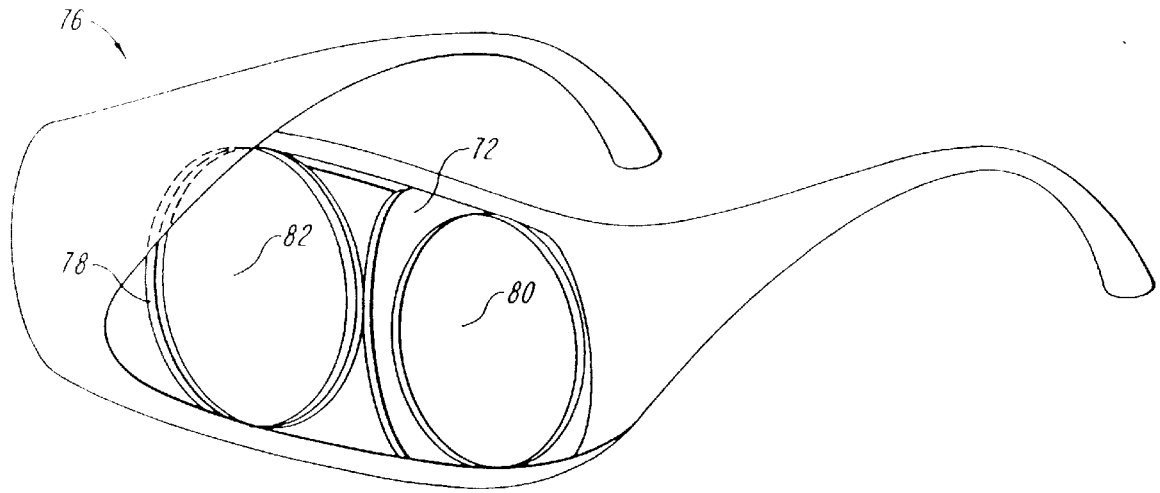
FIG. 12 is another perspective view of the head-mounted display unit of FIG. 11, illustrating a filter mounted to the head-mounted display unit for filtering a selected range of electromagnetic wavelengths.

FIG. 12 illustrates that a filter 82 can be mounted on the head-mounted display unit 76 to filter a selected range of electromagnetic wavelengths. Those skilled in the art will understand that more than one filter can be mounted on a head-mounted display unit according to the invention. For example, two filters, each positioned in front of one eye of a viewer, can provide filtering of a selected range of wavelengths for both eyes.

Figure 13:
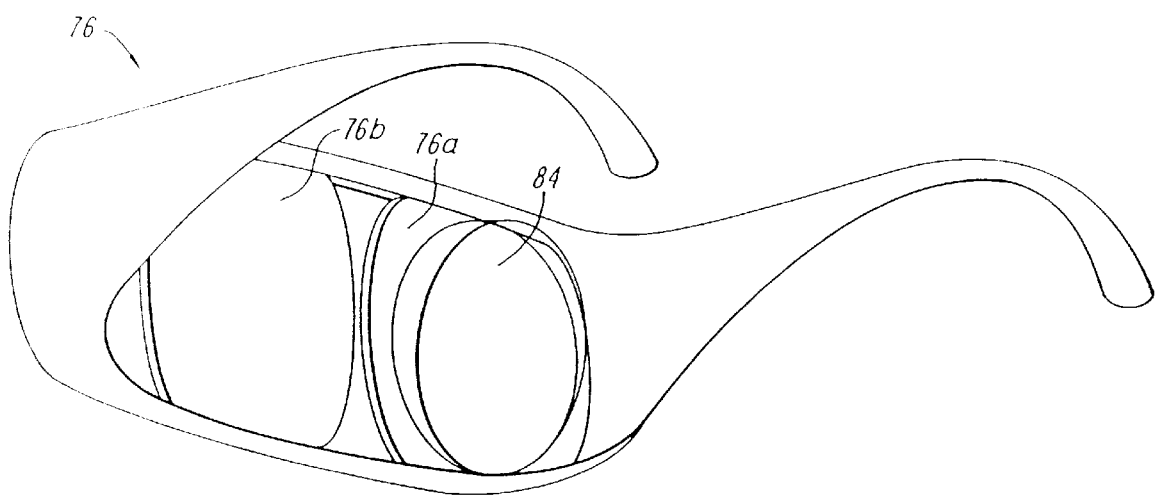
FIG. 13 is a perspective view of another head-mounted display unit according to the invention that includes a prism disposed in front of one screen of the display unit for selectively altering the direction of light rays emanating from an image presented by the screen.

FIG. 13 illustrates an alternative embodiment of the invention in which a prism 84 is mounted to the display unit 76 in front of at least one screen 76a of the display unit 76 to assist a viewer who suffers from macular degeneration to view the image presented on the screen 76a.

Figure 14A:
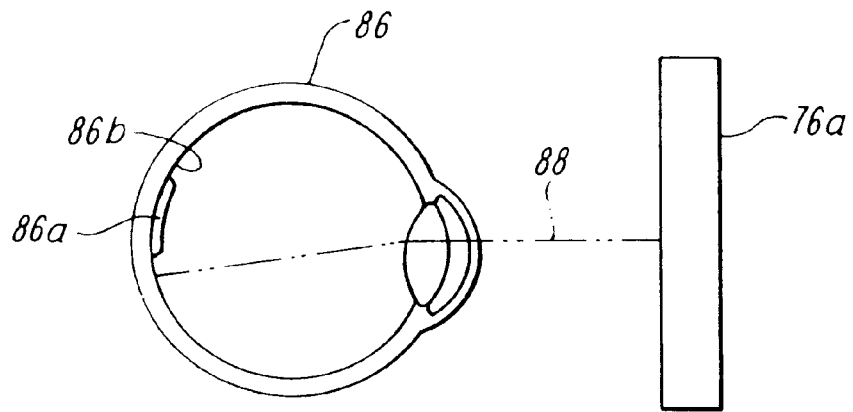
FIG. 14A is a side view of one screen of a display unit according to the invention and an eye globe of a viewer having macular degeneration viewing an image presented on the screen.
Figure 14B:
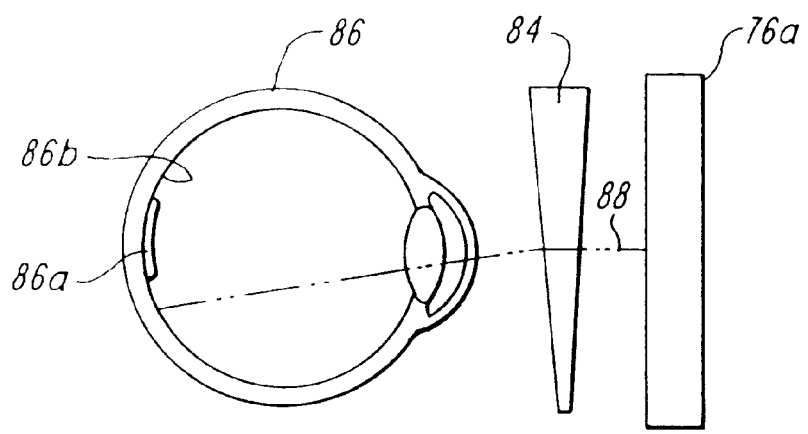
FIG. 14B is a side view of the screen and the eye globe of the previous figure further illustrating a prism disposed between the eye globe and the screen to selectively alter the path of light rays emanating from an image on the screen such that the light rays strike functional portions of the retina.

Patients who suffer from pathologies of the macula typically need to move their eye globes when viewing a scene to ensure that the image of the scene falls on a portion of the retina that is functional. The prism 84 allows such patients to view the image presented by the display unit 76 of the invention without a need to move their eyeglobes. FIGS. 14A and 14B illustrate better this aspect of the invention. In particular, FIG. 14A illustrates the screen 76a without the prism 84, and further illustrates a viewer's cyeglobe 86 disposed in front of the screen 76a for viewing an image presented on the screen 76a. A portion 86a of the viewer's retina 86b suffers from a pathology that renders the portions 86a non-functional. Hence, the viewer has to move the eyeglobe 86 to see the light ray 88. In this example, the viewer has oriented the eyeglobe 86 downward to ensure that the exemplary light ray 88 emanating from the screen 76a avoids the portion 86a and falls on a functional portion of the retina 86b.

In contrast, FIG. 14B illustrates the screen 76a with the prism 84 disposed in front of it. A ray of light emanating from an image presented on the screen 76a travels through the prism 84 before reaching the viewer's eye 86. The prism 84 alters the path of the light ray 88 such that, upon traveling through the eye globe 86, it strikes the retina 86b in a location away from the diseased portion 86a, i.e., it strikes a functional portion of the retina. Hence, the viewer can conveniently view the image presented by the screen 76a without a need to move the eye globe 86.

Those skilled in the art will appreciate that two prisms can be employed in a manner described above if both eyes of a viewer suffer from macular degeneration. Further, if the degeneration of one eye differs from that of the other, each prism can be selected to alter the beam path to provide the required correction for the eye in front of which it is disposed.

While the present invention has been described with reference to above illustrative embodiments, those skilled in the art will appreciate that various changes in form and detail may be made without departing from the intended scope of the present invention as defined in the appended claims.

What is claimed is:

1. An optical guide fixture adapted for coupling visual information present on a surface to an optical receiver, said fixture comprising:
    a body having opposed first and second ends forming respectively input and output optical windows in optical communication with each other and spaced apart by a selected distance along an optical axis,
    said first end being adapted for manually-guided translation along the surface and said second end being adapted for coupling in optical communication with an optical receiver, so that the receiver can receive the visual information present at said input window,
    said body being sufficiently optically transparent for external viewing, through the body, of the surface within the field of view of said input window, and
    manually engageable guide elements mounted with said body and adapted for disposing said body with said input window in selected placement and selected rotational orientation on the surface.

2. An optical guide fixture according to claim 1, wherein at least a portion of said body has a cross-section, transverse to said optical axis, that progressively increases in size along said optical axis so that said input window is larger than said output window.

3. An optical guide fixture according to claim 2, wherein said cross-section is circular and said portion of said body has a conical shape.

4. An optical guide fixture according to claim 1, wherein said body is hollow to provide an air-filled optical path along said optical axis between said input and said output windows.

5. An optical guide fixture according to claim 1, wherein said body is solid.

6. An optical guide fixture according to claim 1, wherein said manually engageable guide elements include a handle region on an outer surface of said body with a manually-perceptible surface irregularity.

7. An optical guide fixture according to claim 6, wherein said manually-perceptible surface irregularity includes a flat for aligning said first end of said guide fixture with a translation indicia on the surface.

8. An optical guide fixture according to claim 6, wherein said manually-perceptible surface irregularity includes a pair of circumferentially-spaced opposed flats that support manually translating said first end of said optical guide fixture relative to the surface with selected linear and rotational orientations relative to the surface.

9. An optical guide fixture according to claim 1, wherein said body is formed of clear plastic material.

10. An optical guide fixture according to claim 1, wherein said manually engageable guide elements form a single, integral unit with said body.

11. An optical guide fixture according to claim 1, wherein said body is tubular.

12. An optical guide fixture according to claim 1, further comprising an optical receiver having a selected focal length, and coupled to said output window of said guide fixture such that it is spaced from said surface by a distance substantially equal to the focal length, said optical receiver receiving along said optical axis an image of at least a portion of the surface within the field of view of said input window.

13. An optical guide fixture according to claim 12, wherein said optical receiver includes a digital camera.

14. An optical guide fixture according to claim 12, wherein said optical receiver has a field of view corresponding to the field of view of said input window.

15. An optical guide fixture according to claim 1, further comprising an optical receiver coupled to said output window of said guide fixture, and a lens disposed within said body between said optical receiver and said input window such that said input window and said optical receiver lie substantially in conjugate planes of said lens, wherein said lens focuses light emanating from at least a portion of the surface within the field of view of said input window onto said optical receiver and said optical receiver provides an image of the at least a portion of the surface.

16. A system for viewing visual information present on a surface, comprising:

an optical guide fixture having a tubular body with opposed ends forming respectively input and output optical windows in optical communication with each other and spaced apart by a selected distance along an optical axis, said first end being adapted for guided translation along the surface, and said second end being adapted for coupling to an optical receiver, said tubular body having at least a portion that is sufficiently transparent to allow external viewing of a portion of the surface within the field of view of said input window, an optical receiver coupled to said output window of said optical guide fixture to provide an image along said optical axis of visual information on the surface within the field of view of said input window, a head-mounted display unit operably coupled to said optical receiver to receive said image and to display said image to a viewer, wherein said optical guide fixture is adapted for being disposed on said surface in a selected orientation and for being translated over said surface in a selected direction, thereby providing a scanned image of the visual information on said surface to the viewer.

17. A system according to claim 16, wherein said head-mounted display unit includes a closed circuit television display unit.

18. A system according to claim 17, wherein said closed circuit television display unit includes a liquid crystal display for displaying said image.

19. A system according to claim 18, wherein said head-mounted display unit includes a holder for removably and replaceably attaching said optical guide fixture to said head-mounted display unit.

20. A system according to claim 16, wherein said head-mounted display unit includes a viewing screen, said viewing screen and said head-mounted display unit being configured to permit placement of said viewing screen at least at first and second locations within said display unit.

21. A system according to claim 20, wherein said first location corresponds to placement of said screen in front of one eye of the viewer, and said second location corresponds to placement of said screen in front of the other eye of the viewer.

22. A system according to claim 16, further comprising at least a corrective lens mounted to said head-mounted display unit to provide visual aid to the viewer.

23. A system according to claim 16, further comprising at least a filter for filtering a selected range of electromagnetic wavelengths.

24. A system according to claim 16, further comprising a control unit for altering contrast polarity of the image the head-mounted display unit presents to the viewer.

25. A system according to claim 16, further comprising at least one prism mounted to said head-mounted display unit for selectively deflecting light rays emanating from said image.

26. A method for providing an image of a selected portion of a surface bearing visual information to a viewer, said method comprising the steps of:

providing an optical guide fixture having an optically transparent tubular body with first and second ends forming respectively input and output optical windows in optical communication with each other and spaced apart by a selected distance along an optical axis, said first end being adapted for manually-guided translation along the surface and said second end being adapted for coupling in optical communication with an optical receiver, said optical guide fixture further including manually engageable guide elements mounted with said tubular body and adapted for disposing said body with said input window in selected placement and selected rotational orientation on the surface, providing an optical receiver mounted to said output window of said optical fixture for receiving visual information present at said input window and producing data corresponding to the received visual information, and providing a head-mounted display unit operably connected to said optical receiver to receive said data and displaying said data to a viewer.

* * * * *